Patented Nov. 21, 1922.

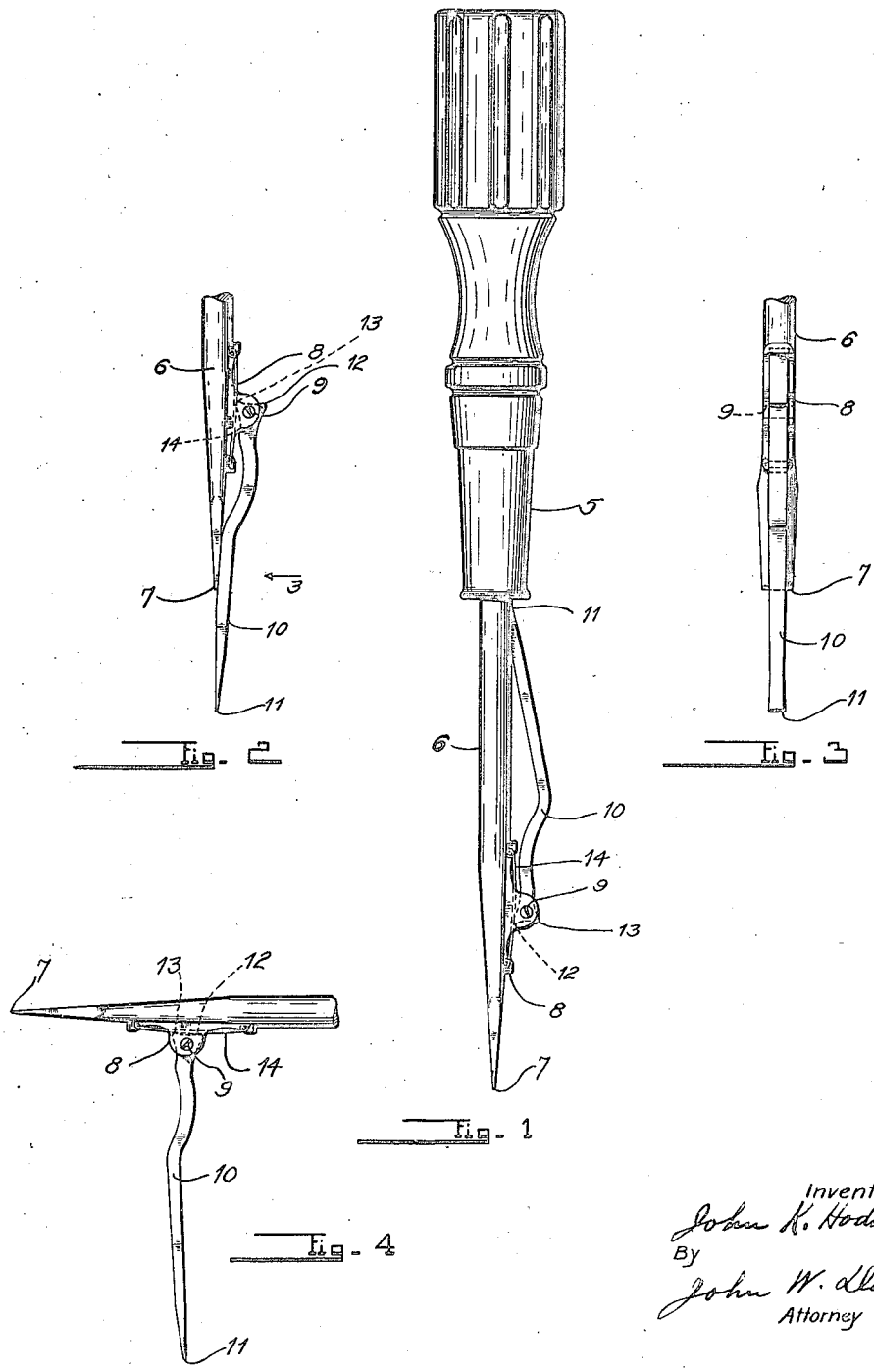

1,436,040

UNITED STATES PATENT OFFICE.

JOHN K. HODDINOTT, OF BALTIMORE, MARYLAND.

COMBINATION TOOL.

Application filed October 19, 1920. Serial No. 418,026.

*To all whom it may concern:*

Be it known that I, JOHN K. HODDINOTT, a citizen of the United States, residing at Baltimore, in the State of Maryland, have invented certain new and useful Improvements in Combination Tools; and I do hereby declare the following to be a full, clear, and exact description of the invention, such as will enable others skilled in the art to which it appertains to make and use the same.

My invention relates to combination tools.

Among the objects of my invention are:

To combine a tool adapted for one purpose with a tool adapted for another purpose (whether related to the first purpose or not) in such a manner that the second tool may be moved to and from its operative positions instantly.

To provide such a form of connection between the second tool and the first so that the second tool may be used in a plurality of positions with reference to the first tool.

To provide means for yieldingly holding the second tool in a plurality of positions with reference to the first tool.

To provide a handle for the first tool which may be used as a handle for operating the second tool, and combining the second tool with the first so that the second tool may be moved to such a position with reference thereto that the first tool may be used as a lever for operating the second tool.

In carrying out my invention I make use of the instrumentalities illustrated in the accompanying drawings, in which:

Figure 1 is a view of my improved tool with the second tool in the inoperative position;

Fig. 2 is a view of my improved tool with the second tool in the position into which it is to be moved when the handle of the first tool is to be used to operate the second tool;

Fig. 3 is a view of the parts shown in Fig. 2 looking in the direction of the arrow 3 in said figure; and Fig. 4 is a view of my improved tool with the second tool in the position into which it is to be moved when the first tool is to be used as a lever for operating the second tool.

In the drawings:

5 represents a handle which may be of any approved type secured to the blade 6 which in the present form of my improved tool is provided at its free end with a screw-driver edge 7.

To the blade 6 is secured the bearing 8 carrying the pintle 9 which is preferably made in the form of a screw threaded into the bearing 8 and having a smooth place upon which turns the second tool 10, in this instance provided with a brad-awl edge 11. The second tool 10 is provided with points 12 and 13 which cooperate with the spring 14 to yieldingly hold the second tool in the various positions hereinafter referred to.

The spring 14 is secured in the bearing in any approved manner and is located to press upon either one or both of the points 12 and 13, as hereinafter explained.

The operation of my improved combination tool is as follows:—

When the parts are in the positions shown in Fig. 1 the screw-driver edge 7 may be used as that of an ordinary screw-driver, the edge 7 being operated by the handle 5.

When the parts are in the positions shown in Figs. 2 and 3, the edge 11 may be used as that of an ordinary brad-awl, the handle 5 being used to operate the edge 11. Then the tool 10 may be moved backwardly to the position shown in Fig. 1 and the edge 7 be used to insert a screw in the hole made by the edge 11.

It frequently happens that when it is desired to bore for a large hole with the edge 11, or to bore a hole in hard wood, that the handle 5 would not give sufficient leverage to perform the work satisfactorily. For the purpose of meeting these conditions, the second tool 10 can be moved to the position shown in Fig. 4 and the blade 6 and handle 5 used as a lever for turning the second tool. When the tool 10 is in the position shown in Fig. 1, the spring 14 bears against the point 12 and yieldingly holds it in that position. When the tool 10 is in the positions shown in Fig. 2, the spring 14 bears against the point 13 and yieldingly holds it in that position. When the tool 10 is in the position shown in Fig. 4, the spring 14 bears against the points 12 and 13 and yieldingly holds it in that position.

The pintle 9 is preferably formed as a screw so that brad-awls having different widths and shapes of edges 11 may be secured to the blade 6 or that tools having other characteristics may be secured to the blade 6, thus making my improved tool suitable for a wide variety of purposes.

While I have shown my improved tool as a combination of a screw-driver and a blade having a brad-awl edge, it is to be understood that my invention is not limited to such a combination. For instance, the edge 7 may be a chisel edge and the edge 11 may be a gouge edge, or the edge 7 may be replaced by a can-opener and the tool 10 may be a corkscrew.

While I have shown the second tool 10 mounted for angular movement with reference to the blade 6, it is to be understood that many forms of attachment may be devised for moving the edge 11 into and out of the operative positions; hence I do not desire to be limited to the exact form of attachment shown.

It is also evident that I may place a plurality of bearings such as 8 upon the blade 6 and may thereby attach to the blade 6 a plurality of tools for various purposes.

I claim:

The combination with a blade and a bearing rigidly fixed thereto, of an awl revolubly mounted on said bearing and movable to operative and inoperative positions, said awl having a portion contacting with said blade when said awl is in the operative position to hold the point of said awl substantially in the axis of said blade, and a spring associated with said bearing and awl for yieldably retaining said awl in either of said positions.

In testimony whereof, I affix my signature.

JOHN K. HODDINOTT.